Patented Feb. 10, 1942

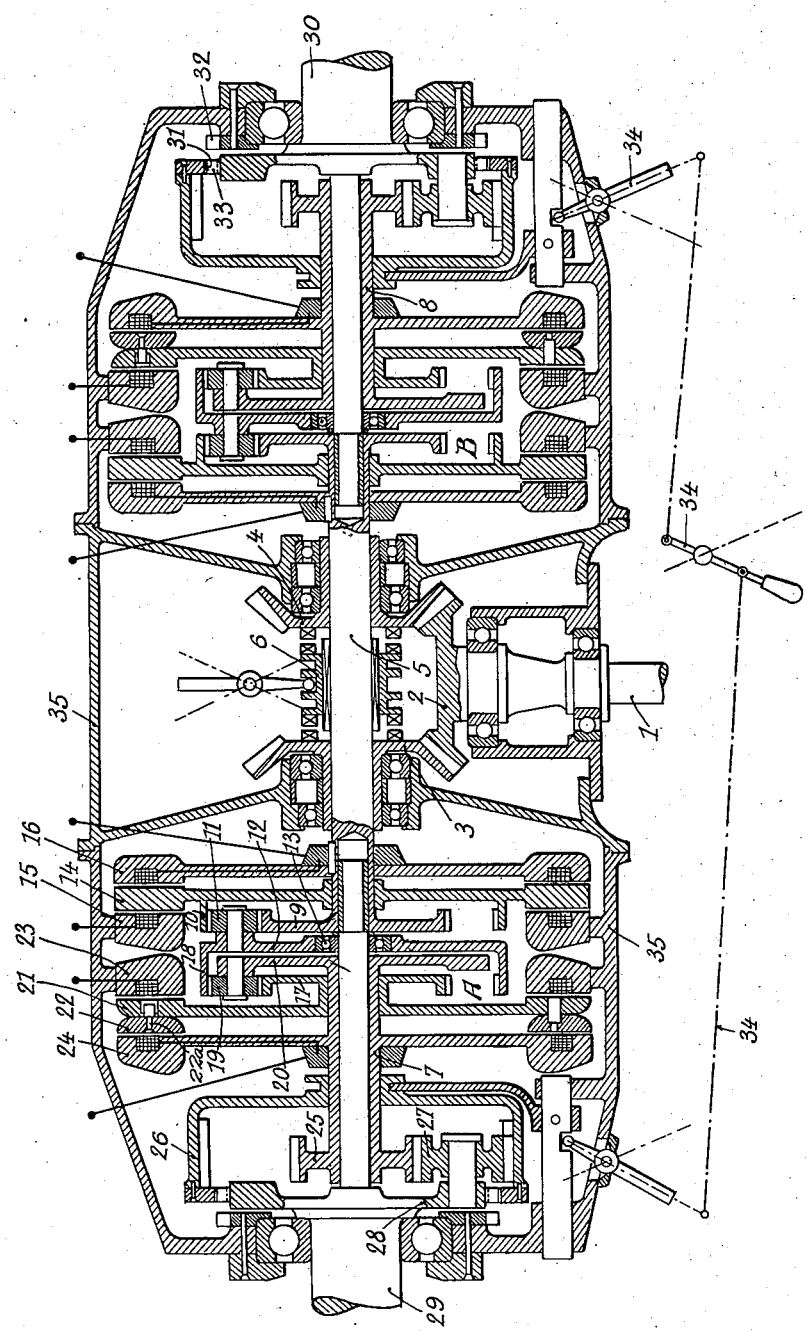

2,272,934

UNITED STATES PATENT OFFICE 2,272,934

MECHANISM FOR POWER TRANSMISSION

Jean Cotal, Paris, France

Application February 23, 1938, Serial No. 192,157
In France February 24, 1937

1 Claim. (Cl. 180—17)

The present invention has for its object a mechanism for power transmission. It is chiefly adapted for use with two endless treads or like propelling parts of a given driving device for motor vehicles.

The mechanism in conformity with the invention is chiefly characterized by the fact that two driven shafts in line, with a common driving shaft, are each actuated by the said shaft by means of a change-speed device, and the two change-speed devices will afford the same sets of speeds, and may be controlled at the same time or separately.

Owing to this disposition, the movements transmitted to the propelling devices which are actuated by the driven shafts may have the same speed for the travel in a straight line, and may have different speeds for travel upon a sinuous path.

Each driven shaft may also be provided with a separate braking device, so that either of the driven shafts may be braked independently of the other.

The common driving shaft is advantageously actuated by the engine by means of a reversing device, which is preferably mounted between the two speed-changing devices which are located symmetrically on either side of the common driving shaft.

The accompanying diagrammatic drawing shows by way of example a constructional form of the power transmission mechanism in conformity with the invention.

The power shaft 1, which is connected with the source of power, carries a bevel gear wheel 2 engaging two bevel gear wheels 3 and 4 which are loose on a driving shaft 5. A sliding sleeve 6, which rotates together with the driving shaft 5, is adapted to connect this shaft either with the wheel 3 or the wheel 4, by which the said shaft 5 can be rotated in two opposite directions, i. e., for forward or for reverse drive, and including the neutral or center position.

The two driven shafts 7 and 8, which serve for instance to actuate the wheels, the endless treads or like propelling devices used for a motor vehicle of any kind, are in line with the shaft 5 and are driven by this shaft by means of two change-speed devices A and B. The said change-speed devices may be of any suitable type, but they must provide for the same series of speeds in each case. The said change-speed devices A and B may be operated at the same time or separately, so that one of the driven shafts may be actuated at the same speed as the other driven shaft, or at a different speed, according as the vehicle is to follow a straight or a sinuous path.

The two change-speed devices A and B will preferably have the symmetrical position on either side of the driving shaft 5. In the construction herein represented, the two change-speed devices are of the electromagnetic type, and each comprises two sets of planetary gears mounted in series. The first of these sets comprises a main wheel 9 which is secured to the driving shaft 5, a ring with internal teeth 10, and planetary pinions 11 mouted upon a planetary carrier 12 which rotates on ball bearings 13. The ring with internal teeth 10 is secured to a disc 14 which is rotatable on the shaft 5 and may be attracted by a stationary electromagnet 15 or by an electro-magnet 16 secured to the driving shaft 5. The second planetary set comprises a central wheel 17 rotatable and slidable on the shaft 7, a ring with internal teeth 18, and planetary pinions 19 mounted on a planetary pinion carrier 20 secured to the respective shaft 7 or 8. The ring with internal teeth 18 forms part of the planetary pinion carrier 12, and the central wheel 17 forms part of a disc device consisting of two members 21 and 22 which are mutually slidable in the axial direction. The member 21 is slidable on the shaft 7 and the member 22 which is axially movable with respect to the member 21 is provided with pins 22a slidable in apertures in the member 21. One of these members may be attracted by a stationary electro-magnet 23 and the other by an electro-magnet 24 which is non-rotatably secured to the respective driven shaft 7 or 8. Each of the said planetary gear sets will provide for two different speeds, thus affording a transmission of four speeds from the shaft 5 to either of the driven shafts.

The various speeds are obtained in the usual manner, on the one hand, by coupling the disc 14 of the ring gear 10 with the stationary electromagnet 15 or the revolving magnet 16 as by energizing the related magnet coil and, on the other hand, by selectively energizing the coils of the magnets 23 and 24 to arrest movement of the members 21 and 22 and the wheel 17 when the stationary magnet 23 is energized or to connect said wheel 17 to the shaft 7 when the magnet 24 is energized.

A braking device of any suitable type is employed with each of the driven shafts, by which one of these shafts may be braked independently of the other. In the construction herein represented, the said braking device consists of the two-part disc 21—22 and of the two electromagnets 23 and 24. By exciting these two electro-magnets at the same time, the stationary electro-magnet 23 retards or stops the members 21 and 22 and a similar braking effect is exerted on the magnet 24 and the shaft 7 or 8 to which it is fixed.

It is further possible, if so desired, to locate between each driven shaft and its respective vehicle propelling wheels or like device, a speed-reducing device which will provide for the direct drive or for a speed-reduction. In the present case, the said speed-reducing device consists of planetary gearing which comprises a central wheel 25 keyed to the driven shaft 7 or 8, a ring 26 with internal teeth rotatable on each driven shaft, and planetary pinions 27 mounted on a planetary pinion carrier 28 which is connected with the propelling member through the shafts 29 or 30. The ring 26 with internal teeth is provided with a toothed ring 31, which may be brought into engagement either with a toothed ring 32 secured to the casing, or with a set of teeth 33 arranged on the planetary pinion carrier 28. In a preferred construction, the two speed-reducing devices are operated at the same time, for instance by rod-and-link gear 34. The change speed devices A and B and the propelling wheels or other members operated thereby may be driven in either the forward or reverse direction by shifting the sleeve 6 to couple the gear wheel 2 alternately with the gear wheels 3 and 4.

The whole apparatus is mounted in a common casing 35 which is provided with an oil circulation for the lubrication and especially for the cooling of the friction members employed for the braking.

It will be observed that the turns in the road can be made by operating the gear cases at various speeds by the use of controllers, and thus the vehicle will be directed towards the side at which the speed is reduced to the greater degree.

Obviously, the invention is not limited to the embodiment herein described, which is given solely for the proper understanding of the invention.

Having now described my invention what I claim as new and desire to secure by Letters Patent is:

In a power transmission device for motor vehicles, a driving shaft, two driven shafts disposed in line with said driving shaft and on either side of said driving shaft, two speed changing devices adapted to afford the same series of at least two speed ratios and interposed respectively between each driven shaft and said driving shaft, each speed changing device comprising a pinion carrier secured to the corresponding driven shaft at least one pinion rotatably mounted on said carrier, two concentric wheels meshing with said pinion, two electro-magnets, one of which is stationary and the other is connected with said corresponding driven shaft, two members rotatable with one of said concentric wheels and relatively slidable in the axial direction and adapted to be brought respectively into contact with said two electro-magnets the other of said concentric wheels being adapted to be operatively connected with said driving shaft and conducting means for energizing said electromagnets whereby said driven shafts may be driven in a determined direction the same speeds or different speeds for steering purposes and each driven shaft may be braked independently of the other.

JEAN COTAL.